(12) United States Patent
Nishizawa et al.

(10) Patent No.: US 6,382,548 B1
(45) Date of Patent: May 7, 2002

(54) TORSION BAR IN SEAT BELT RETRACTOR

(75) Inventors: Muneo Nishizawa; Yasushi Kanamori, both of Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/661,907

(22) Filed: Sep. 14, 2000

(30) Foreign Application Priority Data

Sep. 28, 1999 (JP) .......................................... 11-274272
Aug. 10, 2000 (JP) ........................................ 2000-242318

(51) Int. Cl.[7] ............................................. B60R 22/28
(52) U.S. Cl. .................................................. 242/379.1
(58) Field of Search ...................... 242/379.1; 280/805, 280/806; 297/470, 471, 472, 478

(56) References Cited

U.S. PATENT DOCUMENTS 6,206,315 B1 * 3/2001 Wier ....................... 242/379.1
6,267,314 B1 * 7/2001 Singer et al. ............ 242/379.1

FOREIGN PATENT DOCUMENTS

EP 0 962 366 12/1999
GB 2 331 050 5/1999

* cited by examiner

Primary Examiner—John M. Jillions
(74) Attorney, Agent, or Firm—Kanesaka & Takeuchi

(57) ABSTRACT

A torsion bar in a seat belt retractor includes a torsion portion to be twisted. The torsion portion has an outer portion, and a center portion inside the outer portion. The outer portion has a hardness lower than that at the center portion to thereby increase energy absorption in twisting the torsion portion. Therefore, even if higher stress is applied to the outer portion of the torsion portion when the torsion bar is twisted, the number of turns until the torsion bar is broken can be increased as compared to the conventional one. Accordingly, the belt withdrawing amount is ensured enough after the twisting of the torsion portion is started, thereby improving the energy absorbing capacity.

5 Claims, 5 Drawing Sheets

Fig. 3(a)  ① drawing process
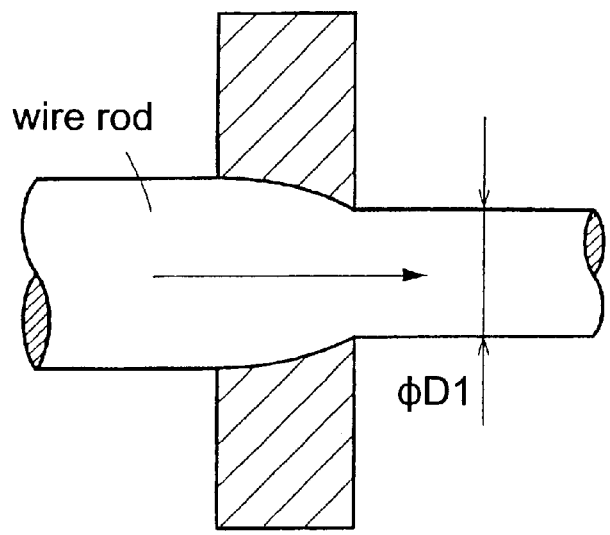
Fig. 3(b)  ② cold forging process
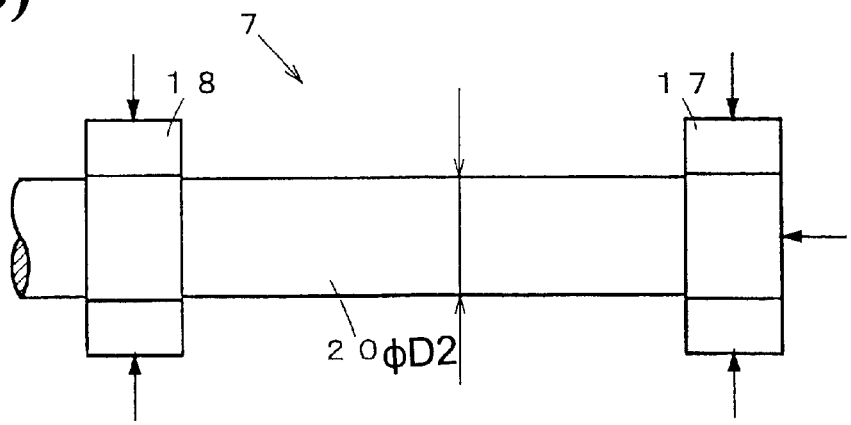

hardness comparison

[Hv unit]

| point | present invention | conventional bar |
|---|---|---|
| ① | 120 | 202 |
| ② | 151 | 199 |
| ③ | 144 | 163 |
| ④ | 151 | 194 |
| ⑤ | 116 | 214 |

TORSION BAR IN SEAT BELT RETRACTOR

BACKGROUND OF THE INVENTION AND RELATED ART STATEMENT

The present invention pertains to a seat belt retractor for accommodating a seat belt to be retracted and withdrawn, and more particularly, to a torsion bar used in a seat belt retractor as a force limiter mechanism (hereinafter, sometimes referred to as EA mechanism) for limiting the load exerted on the seat belt.

Conventionally, a seat belt device installed in a vehicle, such as an automobile, prevents an occupant from being thrown out of a vehicle seat by restraining the occupant with the seat belt thereof, thereby protecting the occupant in the event of an emergency, such as vehicle collision, at which large deceleration is exerted on the vehicle.

Such a seat belt device is provided with a seat belt retractor for accommodating a seat belt to be retracted and withdrawn. The seat belt retractor has biasing means, such as a spiral spring, for always biasing a reel, around which the seat belt is wound, in a retracting direction. When it is not used, the seat belt is fully wound on the reel by the biasing force of the biasing means. When an occupant wears the seat belt, the seat belt is withdrawn against the biasing force of the biasing means. In the seat belt retractor, a locking mechanism is activated in the event of an emergency as mentioned above to stop rotation of the reel in an unwinding direction, thereby preventing the seat belt from being withdrawn. Therefore, the seat belt can securely restrain and thus protect the occupant.

However, the conventional seat belt retractor of the seat belt device has a problem. That is, when the seat belt restrains and protects the occupant, a large deceleration is exerted on the vehicle, so that the occupant tends to move forward due to a large inertia force. Accordingly, a large load is exerted on the seat belt so that the occupant receives a large impact load from the seat belt. Though this impact load is not so severe for the occupant, it is better to reduce the impact load.

Accordingly, a seat belt retractor which has an EA (Energy Absorbing) mechanism to restrict the load that is exerted on the seat belt in the event of an emergency when the seat belt is worn is disclosed in Japanese Utility Model Publication (KOKAI) No. S61-11085.

The seat belt retractor having the EA mechanism disclosed in this publication is provided with a torsion bar. While the seat belt is prevented from being withdrawn in the event of the emergency as mentioned above, a tensile force is exerted on the seat belt by the inertia movement of the occupant in the forward direction, so that a seat belt winding shaft rotates with twisting a torsion portion of the torsion bar, thereby withdrawing the seat belt and thus absorbing the impact energy to the occupant. After the torsion bar is twisted for a predetermined amount, the rotation of the seat belt winding shaft is stopped so as to stop the seat belt from being withdrawn, to thereby protect the occupant. The twisting of the torsion bar is also stopped so as to prevent the torsion bar from being broken.

By the way, the torsion bar in such a seat belt retractor is structured to have a uniform hardness over the entire cross section of the torsion portion or higher hardness at the outer portion than that at the center portion in the cross section of the torsion portion. As the hardness is set as mentioned above, since high stress is applied to the surface of the torsion portion when twisted, the torsion bar may be broken with a relatively small number of turns due to defect or the like on the surface. In the conventional torsion bar, therefore, the seat belt winding shaft may have a small rotational amount until the torsion portion is broken. It is difficult to ensure the enough belt withdrawing amount because of the small maximum allowable twisting deformation at which the torsion portion is not broken. When the belt withdrawing amount can not be ensured enough, there is a limitation in increasing the energy absorbing capacity.

To increase the energy absorbing capacity to the torsion bar, strict quality control for preventing defect on the surface of the torsion bar and design for making the torsion bar itself to be longer can be considered. However, the strict quality control for the defect on the surface makes the manufacturing complex, and the design for making the torsion bar to be longer makes the torsion bar to have a large size and increase the cost.

The present invention has been made under the aforementioned circumstances, and the object of the present invention is to provide a torsion bar in a seat belt retractor, wherein an energy absorbing capacity is improved without increasing the size and can be manufactured at a low cost.

SUMMARY OF THE INVENTION

To solve the aforementioned problems, the present invention provides a torsion bar in a seat belt retractor comprising at least a reel for winding up a seat belt, and a locking mechanism for preventing rotation of the reel in the belt unwinding direction when required. The torsion bar rotationally connects the reel and the locking mechanism, and has a torsion portion which is twisted when the rotation of the reel in the belt unwinding direction is stopped by the locking mechanism so as to absorb energy. The hardness at the outer portion of the torsion portion is set to be lower than the hardness at the center portion of the torsion portion.

In the torsion bar in the seat belt retractor of the present invention structured as described above, even if higher stress is applied to the outer portion of the torsion portion when the torsion bar is twisted, because the hardness at the outer portion is set to be lower than that at the center portion, the stress at the outer portion can be restrained lower than the conventional one. Therefore, the number of turns until the torsion bar is broken can be increased as compared to the conventional one.

Accordingly, the rotational amount of the reel after the twisting of the torsion portion is started can be increased as compared to the conventional one. Therefore, the belt withdrawing amount of the seat belt after the twisting of the torsion portion is started is ensured enough, thereby further improving the energy absorbing capacity.

Because the torsion bar of the present invention has improved energy absorbing capacity, the strict quality control for preventing defect on the surface of the torsion bar is not required, thereby facilitating the manufacturing of the torsion bar. Since the torsion bar of the present invention can be designed to have substantially the same size as the conventional one, increase in cost can be restrained and increase in size of the seat belt retractor is also restrained when the torsion bar is adopted to the seat belt retractor.

BRIEF DESCRIPTION OF THE DRAWINGS

FIGS. 2(a) and 2(b) show an embodiment of a torsion bar according to the present invention, wherein FIG. 2(a) is a front view, and FIG. 2(b) is an explanatory sectional view taken along line 2(b)—2(b) of FIG. 2(a);

FIGS. 3(a) and 3(b) illustrate a manufacturing method of the torsion bar shown in FIGS. 2(a) and 2(b), wherein FIG. 3(a) is a view for explaining a drawing process, and FIG. 3(b) is a view for explaining a cold forging process;

FIGS. 5(a) and 5(b) show results of the twisting tests using the test pieces shown in FIG. 4, wherein FIG. 5(a) is a graph showing a relation between the number of turns and torsional torque, and FIG. 5(b) is a graph showing a relation between a belt stroke and a load on the belt.

DETAILED DESCRIPTION OF THE PREFERRED EMBODIMENT

Hereinafter, an embodiment of the present invention will be described with reference to the attached drawings.

Figure 1:
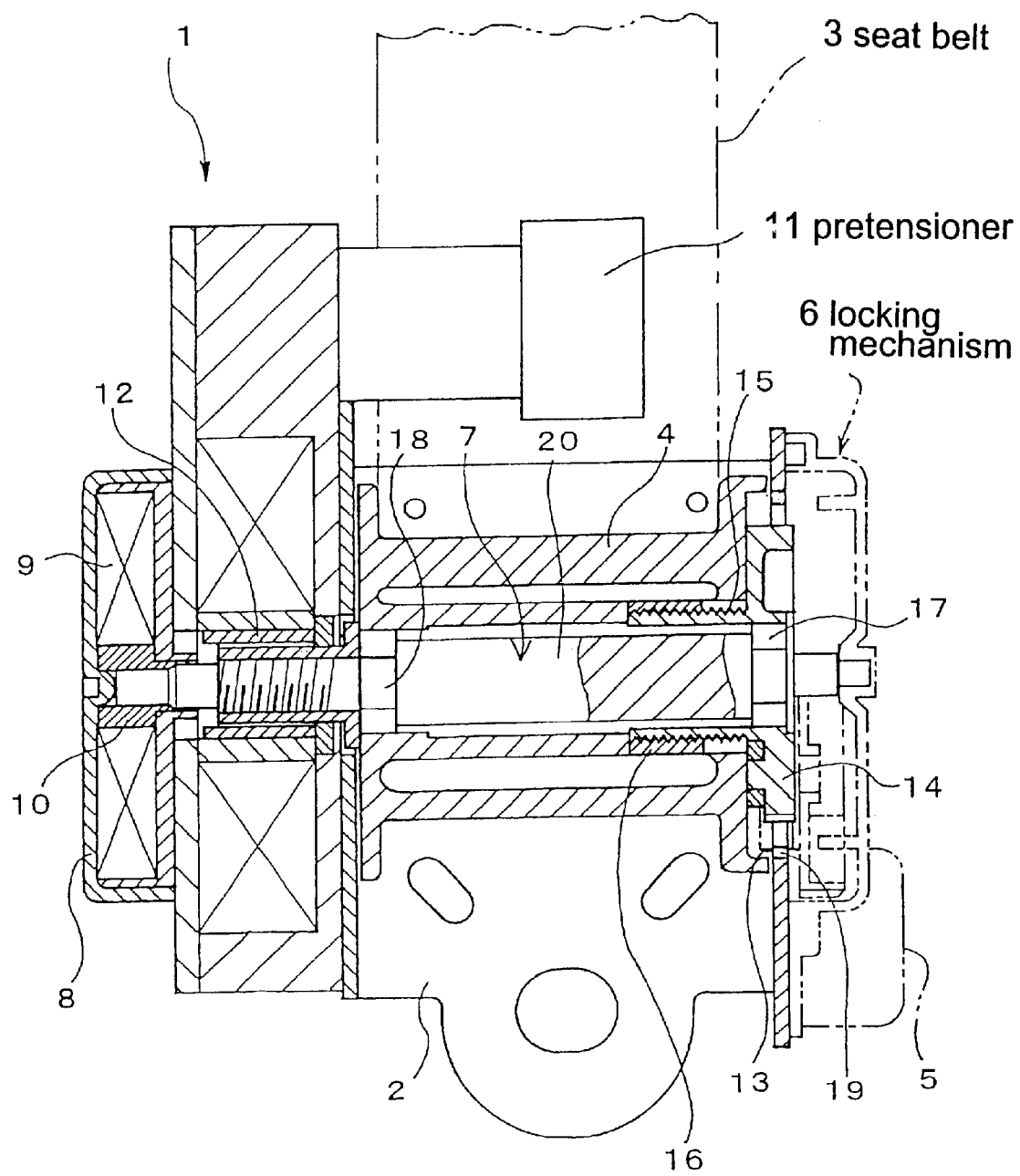
FIG. 1 is a vertical sectional view of a seat belt retractor provided with an EA mechanism in which an embodiment of a torsion bar according to the present invention is employed.

FIG. 1 is a vertical sectional view showing a seat belt retractor provided with an EA mechanism in which an embodiment of a torsion bar according to the present invention is adopted. In this drawing, numeral 1 designates a seat belt retractor, 2 designates a U-like frame, 3 designates a seat belt, 4 designates a reel which is rotatably supported between side walls of the U-like frame 2 and on which the seat belt 3 is wound, 5 designates deceleration sensing means which senses a large deceleration of the vehicle occurred in case of an emergency, 6 designates a locking mechanism which is activated by the deceleration sensing means 5 to prevent the reel from rotating in a belt unwinding direction, 7 designates a torsion bar loosely fitted and inserted in the axial direction in the center of the reel 4 and which rotatably connects the reel 4 and the locking mechanism 6, 8 designates spring means for always biasing the reel 4 in a belt winding direction through a bush shaft 10 by the spring force of a spiral spring 9, and 11 designates a pretensioner which is activated in case of the emergency mentioned above for producing a belt winding torque.

The locking mechanism 6 has a pawl holder 14 which is supported in such a manner that the pawl holder 14 rotates together with the reel 4 in a normal state and stops to produce rotation relative to the reel 4 in the emergency, and which pivotally holds a pawl 13. The pawl holder 14 has an external thread portion 15. Screwed onto the external thread portion 15 is a nut-like stopper member 16 which rotates integrally with the reel 4. The torsion bar 7 has a first torque transmitting portion 17 which is fitted to the pawl holder 14 without a relative rotation, and a second torque transmitting portion 18 which is fitted to the reel 4 without a relative rotation.

The belt winding torque produced by the pretensioner 11 is transmitted to the reel 4 through a bush 12 and the torsion bar 7, whereby the reel 4 winds up the seat belt 3 for a predetermined amount.

The torsion bar 7, the external thread portion 15 of the pawl holder 14, and the stopper member 16 compose the aforementioned EA mechanism.

In the seat belt retractor 1, the belt winding torque produced by the pretensioner 11 in the emergency is transmitted to the reel 4, so that the reel 4 winds up the seat belt 3 for a predetermined amount, thus strongly restraining an occupant. On the other hand, the deceleration sensing means 5 is activated by a large deceleration produced in the emergency to activate the locking mechanism 6. Then, the pawl 13 of the locking mechanism 6 pivots and engages one of internal teeth 19 of the side wall of the frame 2 so as to stop the rotation of the pawl holder 14. As a result of this, the reel 4 rotates relative to the pawl holder 14. Since the first and second torque transmitting portions 17, 18 of the torsion bar 7 therefore rotate relative to each other, a torsion portion 20 between the first and second torque transmitting portions 17 and 18 is twisted. After this, the reel 4 rotates in the belt unwinding direction with twisting the torsion portion 20 of the torsion bar 7. By this twisting of the torsion portion 20, the load applied to the seat belt 3 is limited, thus absorbing the impact on the occupant.

Since the reel 4 rotates relative to the pawl holder 14, the stopper member 16 rotates relative to the external thread portion 15 which is screwed into the stopper member 16, whereby the stopper member 16 moves toward the pawl holder 14. As the right end, in the drawing, of the stopper member 16 comes to contact with the pawl holder 14, the stopper member 16 is prevented from further rotating, so that the reel 4 is also prevented from rotating. In this manner, the maximum allowable twisting deformation at which the torsion portion 20 is not broken is defined, thereby preventing the torsion portion 20 from being broken by the twisting.

Figure 2A:
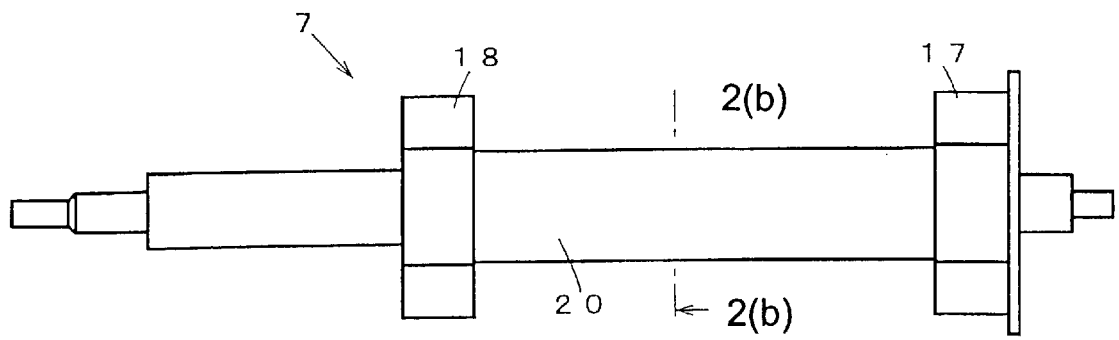
Figure 2B:
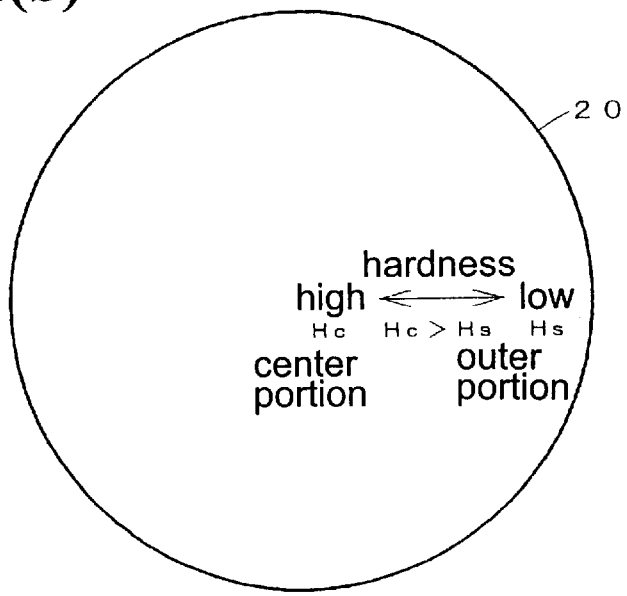

FIGS. 2(a) and 2(b) show the embodiment of the torsion bar according to the present invention, wherein FIG. 2(a) is a front view, and FIG. 2(b) is an explanatory sectional view taken along line 2(b)—2(b) of FIG. 2(a).

As shown in FIGS. 2(a) and 2(b), the torsion portion 20 of the torsion bar 7 in the seat belt winding device 1 is formed such that the hardness Hs at the outer portion in its cross section is slightly lower than the hardness Hc at the center portion. That is, Hc>Hs. The relation between the hardness Hc at the center portion and the hardness Hs at the outer portion is fixed throughout the torsion portion 20 in the axial direction.

As one of the ways for forming the torsion portion 20 such that the hardness at the outer portion is lower than the hardness at the center portion, the following method may be employed. That is, as shown in FIG. 3(a), a metallic wire rod is drawn by a drawing process and is squeezed to make the diameter thereof to be a diameter D1 so as to increase the tensile strength of the wire rod. Then, as shown in FIG. 3(b), the wire rod of the diameter φD1 is pressed in the axial direction thereof by the cold forging operation to form the first and second torque transmitting portions 17, 18 and to make the torsion portion 20 to have a diameter φD2 wherein φD2−φD1=0.05~0.75 mm by using forging dies. By setting the relation between the diameter of the torsion portion 20 after the drawing process and that after the cold forging process as mentioned above, the hardness at the outer portion of the torsion portion 20 becomes lower than the hardness at the center portion of the torsion portion 20. As a material having the hardness increased by the drawing process is pressed, the hardness of the material tends to become closer to the original hardness. By utilizing this property, the dies are set in such a manner that the diameter of the wire rod is increased by the cold forging process as compared to that just after the drawing process, whereby the hardness becomes slightly closer to the original hardness. When the rod is pressed in the axial direction thereof by the cold forging operation, the outer portion is deformed larger than the center portion so that the hardness at the outer portion becomes closer to the original hardness than the hardness at the center portion. Therefore, by setting φD2−φD1 in the aforementioned range, Hc>Hs is achieved.

The other structures of the torsion bar 7 of this embodiment and the other structures of the seat belt retractor employing the torsion bar 7 are the same as those of the conventional one.

In the torsion bar 7 of this embodiment structured as mentioned above, even if higher stress is applied to the outer portion of the torsion portion 20 when the torsion bar 7 is twisted, because the hardness at the outer portion is set to be lower than that at the center portion, the stress at the outer portion can be restrained to be lower than the conventional one. Therefore, the number of turns until the torsion bar 7 is broken can be increased as compared to the conventional one.

By employing the torsion bar 7 of this embodiment in a seat belt retractor 1 just like the conventional one, the rotational amount of the reel 4 after the rotation of the pawl holder 14 is stopped is increased, so that the belt withdrawing amount is ensured enough, thereby improving the energy absorbing capacity.

Figure 4:
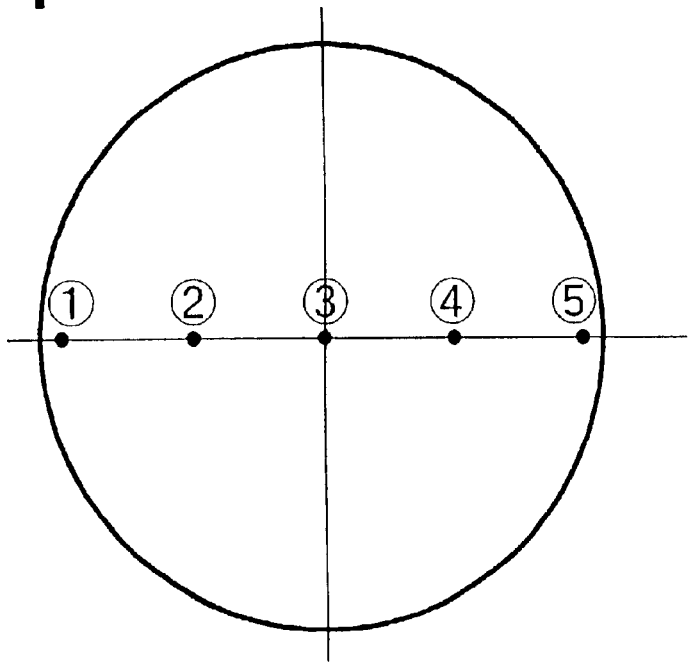
FIG. 4 is a view for explaining a test piece used in twisting tests of the torsion bar of the present invention.
Figure 5A:
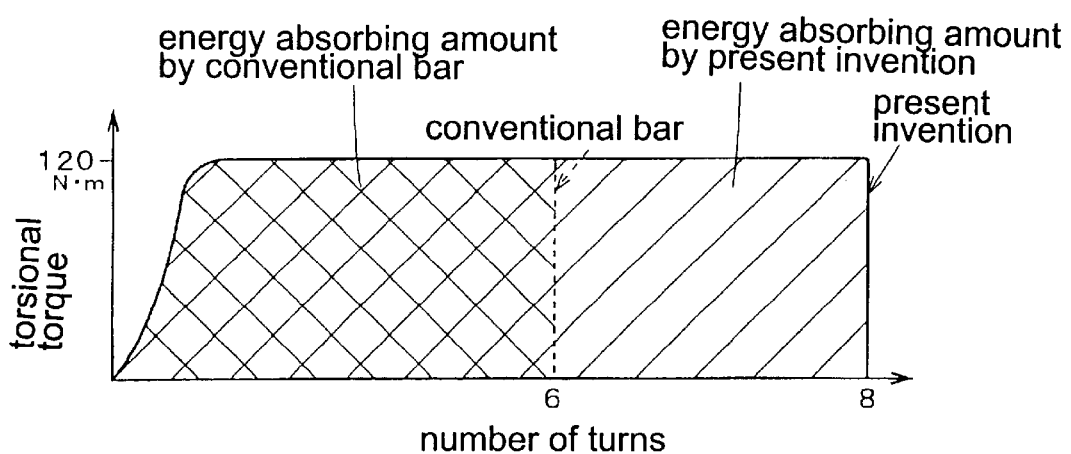
Figure 5B:
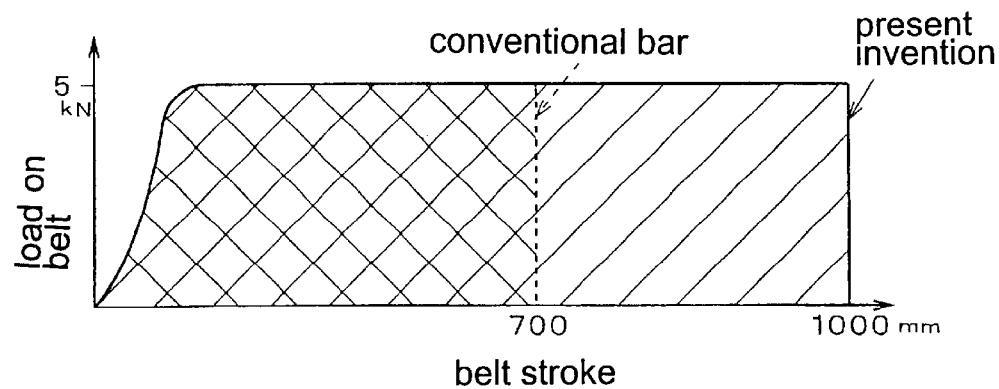

Actually, tests had been conducted for comparison between the torsion bar 7 of this embodiment and the conventional torsion bar 7. The hardness in the cross section at the middle in the axial direction of the torsion portion 20 is set to have values shown in FIG. 4. As a result of the tests, in case of twisting the torsion bars at a torsional torque of 120 N·m as shown in FIG. 5(a), the conventional torsion bar was broken by about 6 turns, while the torsion bar 7 of the present invention was broken by about 8 turns. That is, as compared to the conventional torsion bar 7, the number of turns of the torsion bar 7 of the present invention is increased by 30% and the energy absorbing amount is about 1.3 times. As shown in FIG. 5(b), the belt withdrawing amount of the seat belt 3 allowed by the torsion bar 7 of the present invention is also about 1.3 times longer than that of conventional one. It should be noted that the values shown in FIG. 4 and FIG. 5(a), 5(b) are just values of the tests and never limit the scope of the present invention.

The other operations of the seat belt retractor 1 employing the torsion bar 7 of this embodiment are the same as those of the aforementioned conventional one.

In this manner, according to the torsion bar 7 of this embodiment, since the hardness at the outer portion of the torsion portion 20 is set to be lower than that at the center portion thereof, the rotational amount of the reel 4 after the rotation of the pawl holder 14 is stopped, i.e. after the twisting of the torsion portion 20 is started, can be increased as compared to the conventional one. Therefore, the belt withdrawing amount of the seat belt 3 after the rotation of the pawl holder 14 is stopped can be ensured enough, thereby further improving the energy absorbing capacity.

Because the torsion bar of this embodiment has improved energy absorbing capacity, the strict quality control for preventing defect on the surface of the torsion bar 7 is not required, thereby facilitating the manufacturing of the torsion bar 7. Since the torsion bar of this embodiment can be designed to have substantially the same size as the conventional one, the increase in cost can be restrained and the increase in size of the seat belt retractor is also restrained even when the torsion bar is adopted to the seat belt retractor.

As apparent from the above description, according to the torsion bar in the seat belt retractor of the present invention, since the hardness at the outer portion of the torsion portion is set to be lower than the hardness at the center portion, the belt withdrawing amount of the seat belt after the twisting of the torsion portion is started, can be ensured enough as compared to the conventional one, thereby further improving the energy absorbing capacity.

Because the torsion bar of the present invention has improved energy absorbing capacity, the strict quality control for preventing defect on the surface of the torsion bar is not required, thereby facilitating the manufacturing of the torsion bar.

Since the torsion bar of the present invention can be designed to have substantially the same size as the conventional one, the increase in cost can be restrained and the increase in size of the seat belt retractor is also restrained even when the torsion bar is adopted to the seat belt retractor.

While the invention has been explained with reference to the specific embodiment of the invention, the explanation is illustrative and the invention is limited only by the appended claims.

What is claimed is:

1. A torsion bar in a seat belt retractor, comprising:
   a torsion portion to be twisted, said torsion portion having an outer portion, and a center portion situated inside the outer portion and formed integrally with the outer portion as one unit without a boundary therebetween, said outer portion having a hardness lower than that at the center portion to thereby increase energy absorption in twisting the torsion portion.

2. A torsion bar according to claim 1, further comprising torque transmitting portions situated away from each other, said torsion portion being situated between the torque transmitting portions.

3. A torsion bar according to claim 2, wherein said outer portion is an outer peripheral area and surrounding entirely the center portion.

4. A combination of the torsion bar according to claim 1 and said seat belt retractor, said seat belt retractor including at least a reel for winding a seat belt, and a locking mechanism for preventing rotation of the reel in a belt unwinding direction when required, said torsion bar rotationally connecting the reel and the locking mechanism, said torsion portion being twisted when a rotation of the reel in the belt unwinding direction is stopped by the locking mechanism.

5. A torsion bar according to claim 1, wherein said torsion portion having the outer portion and the center portion is one member made of a same material to have the hardnesses different from each other.

* * * * *